3,313,689
COMPOSITIONS AND METHODS FOR TREATING DEPRESSION

Jean-Eugène Thuillier, Paul Rumpf, and Germaine Thuillier, Paris, France, assignors to Centre National de la Recherche Scientifique and Institut National d'Hygiène, Paris, France, jointly, both corporations of France
No Drawing. Filed Mar. 2, 1964, Ser. No. 348,850
Claims priority, application France, Mar. 1, 1963, 926,547
8 Claims. (Cl. 167—65)

This invention relates to pharmaceutical compositions for the treatment of depressive conditions, more particularly a composition containing as an active component an amide of an aryl-substituted aliphatic carboxylic acid.

It is known that various psychotropic compounds exhibit local anaesthetic properties; such is the case, for instance, with imipramine and many phenothiazine derivatives; conversely, cocaine, administered in certain amounts, exerts a strong excitant effect. However, there exists no constant correlation between the stimulating or depressive properties and the local anaesthetic activity; actually, up to now, the anti-depressive properties of chemical compounds have generally been discovered only by chance.

We have now found, by employing new tests, that the 2 - diethylaminoethylamides of parachlorophenylsulfonyl acetic acid and paramethoxy phenoxy acetic acid of the respective fromulae:

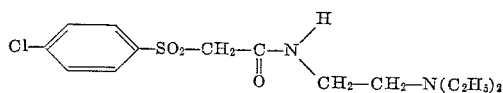

and

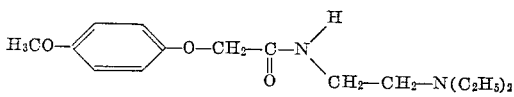

show a valuable anti-depressive activity along with a non-negligible activity as local anaesthetics and, consequently, that it is possible, in particular, to administer the same, with a view to treating depressive conditions, by routes and in the form of compositions which are not employed with local anaesthetics.

The second-named compound (hereinafter termed "compound 297") is known as a chemical. The first-named compound (hereinafter termed "compound 1056") may be produced by reacting β-diethylamino-ethylamine with ethyl-p-chlorophenyl-sulfonyl-acetate.

The following example is illustrative.

EXAMPLE (a) p-Chlorophenyl-mercaptoacetic acid:

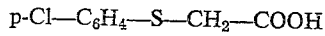

72 g. of p-chloro-thio-phenol were dissolved into a large excess of NaOH, 10 N (200 ml.) and 50 g. of monochloroacetic acid added thereto. The mixture was kept at the boiling point for three hours. After cooling, the solution was acidified, thus provoking precipitation of p-chlorophenyl-mercaptoacetic acid. Melting point: 106° C. Yield=62%.

(b) p-Chlorophenyl-sulfonylacetic acid:

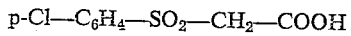

10 g. of p-chlorophenylmercaptoacetic acid were dissolved into 40 ml. of acetic acid and treated with 100 g. of 30% hydrogen peroxide, at room temperature. The mixture was then heated under reflux for three hours. After cooling, p-chlorophenyl-sulfonylacetic acid separated as an oil which crystallized slowly. Melting point: 122° C. Yield: 57%.

The melting point is identical with the melting point of the p-chlorophenyl-sulfonylacetic acid prepared from sodium p-chlorophenyl-sulfinate and monochloroacetic acid.

(c) Diethylaminoethylamide of p-chlorophenylsulfonylacetic acid:

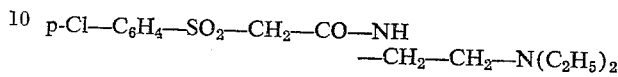

p-Chlorophenyl-sulfonylacetic acid was converted to its ethyl ester by heating under reflux with an excess of ethanol, in the presence of concentrated sulfuric acid.

11 g. of the ethyl ester (boiling point$_{12}$=172° C.) were heated for three hours with 5 g. of diethylamino-ethylamine at the boiling temperature of latter. After cooling, the mixture was taken back with water, the basic amide produced was extracted with ether, and the hydrochloride thereof was precipitated by passing a stream of dry hydrogen chloride through the solution. Recrystallization from anhydrous isopropanol gave 7 g. of crystals having a melting point of 159° C., with a yield of 49%.

The evaluation of the anti-depressive properties of the above defined amides was effected by means of the following tests:

Test A.—Study of anti-reserpine activity 2.5 mg./kg. of reserpine are injected intravenously in rabbits. One hour after injection, the animal is prostrated and, moreover, its eyelids are shut; this blepharoptosis is characteristic.

Several compounds showing anti-depressive activities are capable of suppressing this phosis, when they are injected in reserpine-treated rabbits. Such is the case for example with imipramine, amphetamine, various inhibitors of monoamino-oxydase and β-diethylaminoethylamide of p-chlorophenoxyacetic acid.

The technique employed comprises perfusing a solution of the anti-depressive compound in a given concentration intravenously at constant speed, in a rabbit. The time at which ptosis disappears is noted.

The ratio $$\frac{ED}{LD} \times 100$$

where ED represents the effective dose, i.e. the dose (mg./kg.) which suppresses the ptosis and LD is the lethal dose 100% of the compound. The lower the ratio, the more efficient is the drug.

Test B

The method is based upon the fact that the threshold of convulsing action of bemegride, lowered by reserpine, can be raised by means of an anti-depressive agent. Thus, a reserpine-treated animal (2.5 mg./kg.; i.v.; rabbit) is much more sensitive to convulsing agents; on the contrary, if the reserpine treated animal is given an anti-depressive agent, the resistance of the animal is enhanced; the basis of these phenomena is a mobilization of biogenous amines by reserpine.

The following table gives the results obtained by means of Tests A and B with regard to the anti-depressive activity (in the table, ++=moderate activity and +++=high activity), as well as the different toxicities (the LD 50 being evaluated according to the Litchfield method).

TABLE

| No. of compound | Anti-depressive activity | LD 50 |
|---|---|---|
| 297 | +++ | 110 } Mg./kg. (mouse, i.v.). |
| 1056 | ++ | 160 } |

Besides, the said compounds exhibit local anaesthetic properties.

More particularly the following properties were found as to compound No. 297.

Administered intraperitoneally in mice in a dosage of 250 mg./kg., it produced motive inhibition, hyperexcitability, clonospasms and tachynea, and in rabbits in a dosage of 50 mg./kg., it produced motive inhibition, hypotonia, semi-ptosis and slight hyperthermia.

In the experimental sleep test, compound No. 297 behaved as follows: said compound having been administered intraperitoneally in a dosage of 50 mg./kg. to mice which 30 minutes later were given intraperitoneally N,N-diethylamide of 2-methoxy-4-allyl-phenoxy acetic in a dosage of 60 mg./kg. (amount required for causing 100% of the mice in a lot to sleep) we found an average sleep time of 8 minutes as measured between the time at which the standing-up reflex disappeared and the time at which it reappeared spontaneously.

In a further test purporting to determine the effect of compound No. 297 on hyperthermia produced in rabbits by lysergic acid diethylamide LSD 25 administered intravenously in a dosage of 100 μg./kg. thirty minutes before administering said compound and reference compounds intravenously, the following results were recorded, rectal temperature being measured 1 hour after injection of LSD 25.

| Compounds | Dosage, mg./kg. | Average thermic peak | | Action towards LSD 25 |
|---|---|---|---|---|
| | | Compound alone, °C. | With LSD 25, °C. | |
| Controls | | | +1.8 | |
| No. 297 | 25 | +1 | +2.4 | Additive synergy. |
| DOPA | 50 | −0.5 | +2 | Potentialization. |
| 5HTP | 50 | +1 | +3.5 | Additive synergy. |
| Metamphetamine | 4 | +1.2 | +3 | Potentialization. |
| Imipramine | 2 | 0 | +2.8 | Antagonism. |
| Do | 8 | 0 | +1.3 | |

In Test B, bemegrid being administered to rabbits intravenously as a 0.5 percent aqueous solution at a rate of 0.5 ml./min., and reserpine intravenously in a dosage of 2.5 mg./kg. one hour before administering bemegrid, the following results were recorded:

| Compounds | Dosage, mg./kg. | Time between admin. of cpd. tested and beginning of admin. of bemegrid | Dosage of bemegrid required for first apneic convulsive fit | Corresponding dosage in rabbits previously treated with reserpine |
|---|---|---|---|---|
| Controls | | | 14 | 6 |
| No. 297 | 25 | 10 | 9 | 5 |
| DOPA | 50 | 10 | 15 | 4 |
| 5HTP | 40 | 10 | 20 | 60 |
| Iproniazide | 40 | 120 | 12 | 7 |
| Imipramine | 5 | 30 | 18 | 11 |
| Metamphetamine | 4 | 10 | 75 | 90 |

In Test B, compounds to be tested were injected into ear marginal vein of rabbits and 30 minutes later reserpine or tetrabenazine were administered intravenously in respective dosages of 2.5 mg./kg. and 20 mg./kg. The following results were recorded.

| Compounds | Dosage, mg./kg. i.v. | Reserpine | | Tetrabenazine | |
|---|---|---|---|---|---|
| | | Ptosis | Myosis | Ptosis | Myosis |
| No. 297 | 25 | 0 | 0 | 0 | 0 |
| DOPA | 50 | ++ | 0 | ++ | ++ |
| 5HTP | 40 | + | + | + | + |
| Iproniazide | 40 | ++ | 0 | ++ | ++ |
| Imipramine | 5 | + | + | 0 | 0 |
| Metamphetamine | 4 | ++ | + | 0 | 0 |

++ Marked protection.
+ Slight protection.
0 No protection.

In the same test for determining the curative effect of blepharospasm caused by reserpine in rabbits, reserpine was injected intravenously in rabbits in a dosage of 2.5 mg./kg. then one hour later, the compounds to be tested were perfused intravenously; the following results were obtained:

| Compounds | Rate of perfusion | ED,[1] mg./kg. | LD,[2] mg./kg. | $\frac{ED}{LD} \times 100$ |
|---|---|---|---|---|
| No. 297 | 10 | 7 | 180 | 4 |
| DOPA | 50 | 20 | >1,000 | <2 |
| Iproniazide[3] | 5 | | | |
| Imipramine | 2.5 | 10 | 40 | 25 |
| Metamphetamine | 2 | 1.4 | 280 | 0.5 |

NOTES:
[1] ED is the perfused dosage which suppresses ptosis.
[2] LD is the lethal dose of a solution having the same concentration, perfused intravenously at the same rate.
[3] Iproniazide did not suppress the ptosis in the conditions indicated.

As to compound No. 1056, it was found to produce
(a) A decontracturing effect on spontaneous peristalsis of rabbit isolated ileum in a concentration of 5 mg./litre, and on rabbit duodenum in a concentration of 10 mg./litre;

(b) A decontracturing effect towards acetylcholin contraction (caused by 5γ of acetylcholin) in a concentration of 15 mg./litre;

(c) An antiserotonic effect towards the oedema caused in rat leg (after injecting 0.1 ml. of serotonine), in a dosage of 200 mg./kg. (oral administration).

The above defined amides may be administered in the form of the salts they give with acids acceptable from the pharmacological point of view, in particular hydrochloric acid, lower aliphatic acids, such as isobutyric, diethylacetic, fumaric, maleic, oxalic, citric, lactic, tartaric and ethanedisulfonic acids, and also phenylpropionic, phenylbutylacetic and p-acetamido-benzoic acids.

They may be formulated with an excipient for tablets, a liquid carrier for solutions injectable via the subcutaneous, intramuscular or intravenous route, or an excipient for suppositories.

The following is a typical formulation for tablets.

|  | G. |
|---|---|
| Active compound | 0.050 |
| Tricalciumphosphate | 0.075 |
| Lactose | 0.050 |
| Talc | 0.015 |
| Polyvinylpyrrolidone in alcoholic solution | 0.00075 |
| Talc | 0.050 |
| Magnesium stearate | 0.050 |

Injection phials may contain 5 ml. of 1% solution of the active compound and suppositories may be formulated with 0.15 g. of the active compound.

The average daily oral dose for the treatment of depressive conditions in humans is 10 to 300 mg. The method of treating depressive conditions in humans comprises administering not less than one percent of the active compound.

We claim:

1. A composition in dosage unit form for the treatment of depressive conditions, comprising from 10 to 300 milligrams of a compound selected from the group consisting of the 2-diethylaminoethyl amide of parachlorophenylsulfonylacetic acid, the 2-diethylaminoethyl amide of paramethoxyphenoxy-acetic acid and the salts thereof with pharmacologically acceptable acids, and a pharmaceutical carrier.

2. A composition in dosage unit form for the treatment of depressive conditions according to claim 1, wherein said pharmaceutical carrier is a solid.

3. A composition in dosage unit form for the treatment of depressive conditions according to claim 2, comprising a tablet containing about 0.050 g. of said compound.

4. A method for the treatment of depressive conditions, which comprises administering a compound selected from the group consisting of the 2-diethylaminoethyl amide of parachlorophenylsulfonylacetic acid, the 2-diethylaminoethyl amide of paramethoxyphenoxy-acetic acid and the salts thereof with pharmacologically acceptable acids to a human patient in a daily oral dose of from 10 to 300 milligrams.

5. A method for the treatment of depressive conditions, which comprises administering not less than one percent of a compound selected from the group consisting of the 2-diethylaminoethyl amide of parachlorophenylsulfonylacetic acid, the 2-diethylaminoethyl amide of paramethoxyphenoxy acetic acid and the salts thereof with pharmacologically acceptable acids to a human being in a daily oral dose which provides from 10 to 300 milligrams of the said compound.

6. An injectable preparation for the treatment of depressive conditions, containing a composition according to claim 1 in a liquid carrier.

7. An injectable preparation according to claim 6, in single-dosage form, comprising about 5 ml. of a solution of about 1% of said compound.

8. A suppository containing a composition according to claim 1, comprising about 0.15 g. of the active compound.

No reference cited.

ALBERT T. MEYERS, *Primary Examiner.*

JULIAN S. LEVITT, *Examiner.*

N. G. MANN, JR., S. J. FRIEDMAN,
*Assistant Examiners.*